(12) United States Patent
Andreasson et al.

(10) Patent No.: US 7,639,789 B2
(45) Date of Patent: Dec. 29, 2009

(54) CONTACTING IDENTITY SHARING

(75) Inventors: Markus Andreasson, Lund (SE);
Henrik Bengtsson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 475 days.

(21) Appl. No.: 11/364,348

(22) Filed: Mar. 1, 2006

(65) Prior Publication Data

US 2007/0206746 A1   Sep. 6, 2007

(51) Int. Cl.
*H04M 15/06* (2006.01)
(52) U.S. Cl. .............................. 379/142.01; 455/426.1
(58) Field of Classification Search .................. None
See application file for complete search history.

(56) References Cited

U.S. PATENT DOCUMENTS 5,764,731 A * 6/1998 Yablon ..................... 379/88.15
6,625,444 B1   9/2003 Fleming et al.
2007/0022213 A1 * 1/2007 Fahmy et al. ............... 709/246

FOREIGN PATENT DOCUMENTS

GB   2399255   9/2004

OTHER PUBLICATIONS

"Method for Electronic Transfer of Telephone Number from a First Party to a Second Party" Research Disclosure, Mason Publications, Hampshire, GB, No. 438, Oct. 2000, p. 1739, XP000994125.
PCT International Search Report and Written Opinion, Dec. 6, 2006.
* cited by examiner

*Primary Examiner*—Lester Kincaid
*Assistant Examiner*—Phuoc Doan
(74) *Attorney, Agent, or Firm*—Harrity & Harrity, LLP

(57) ABSTRACT

The present invention simplifies the setting up of a connection to a candidate party from a first portable communication device (10) associated with a first party in relation to a session between the first and a second party (12). As the first and the second parties engage in a first communication session, the first party receives an electronic message (M) from the second party and determines if the message is a message associated with the first session comprising a contacting identity for reaching the candidate party. If the message is such a message the contacting identity is extracted and the first party is offered to connect to the candidate party. If the first party accepts the offer, a connection to the candidate party is initiated using the contacting identity.

33 Claims, 5 Drawing Sheets

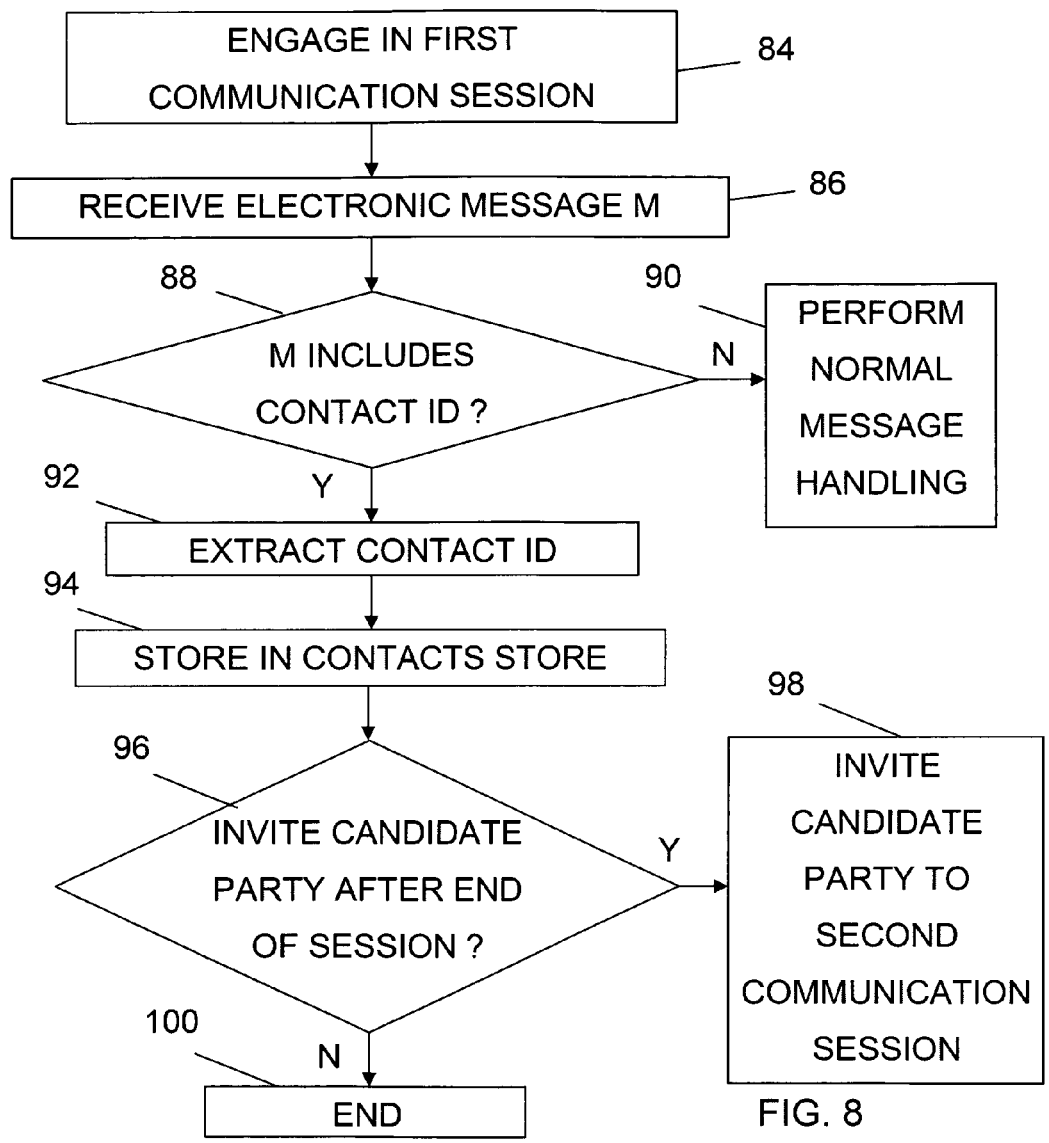

CONTACTING IDENTITY SHARING

TECHNICAL FIELD OF THE INVENTION

The present invention relates to the field of telecommunication and then more particularly towards enabling a portable communication device that is involved in a communication session between a first and a second party to be able to simplify a connection to a candidate party in relation to the session. The present invention is therefore directed towards a method and a computer program product for simplifying the setting up of a connection to a candidate party from a first portable communication device associated with a first party in relation to a session between the first and a second party and such portable communication devices. The invention is also related to a method and a computer program product for delivering a contacting identity regarding a candidate party to a first party from a communication device associated with a second party during a session between the first and the second party as well as such a communication device. The invention is furthermore related to a communication network providing communication sessions between a first party and a second party.

DESCRIPTION OF RELATED ART

It is known within the field of portable communication devices to use them in communication sessions between one or more different parties. When this happens, a first of the parties may ask for information from the second party that enables a communication with a third party. In the case of voice connections, this is then normally provided orally from the second party to the first party, either by a person directly to the first party or through the use of a voice mail message. The first party then has to enter the information needed for connecting to the third party manually into the portable communication device, which then connects to the third party. It is also possible for the first party to record the oral information and then later play the recorded message in order to obtain the contacting information.

This is tedious for the first party. The first party may also need to write the information down in order not to forget it.

It is furthermore known to send electronic messages from the second party to the first party, where such a message might be sent during the session. However, in this case the first party has to determine himself that the message was sent from the second party, then open the message and store the contact information and thereafter during or after the session himself initiate a connection to the third party.

It would therefore be advantageous from a user perspective to simplify the situation considerably by allowing the first party to automatically or with as few steps as possible engage in a session with a candidate party based on information received in a session with a second party.

SUMMARY OF THE INVENTION

The present invention is directed towards solving the problem of simplifying the contacting of a candidate party from a first party in relation to a communication session between the first and a second party.

One object of the present invention is to provide a method of simplifying the setting up of a connection to a candidate party from a first portable communication device associated with a first party in relation to a session between the first and a second party.

According to a first aspect of the present invention this object is achieved by a method of simplifying the setting up of a connection to a candidate party from a first portable communication device associated with a first party in relation to a session between the first and a second party and comprising the steps of:
  engaging in a first communication session between the first and the second party,
  receiving an electronic message from the second party,
  determining if the message is a message associated with the first session comprising a contacting identity for reaching the candidate party,
  if the message is a message associated with the first session comprising a contacting identity
    extracting the contacting identity from the message,
    offering the first party to connect to the candidate party, and
    in case the first party accepts the offer, initiating a connection to the candidate party using the contacting identity.

A second aspect of the present invention includes the features of the first aspect, further comprising the step of storing the contacting identity in a contacts store of the first portable communication device.

A third aspect of the present invention includes the features of the first aspect, wherein the step of offering the first party to connect to the candidate party comprises offering the first party to invite the candidate party to the first session and the step of initiating a connection to the candidate party comprises inviting the candidate party to the first communication session between the first and the second party.

A fourth aspect of the present invention includes the features of the first aspect, wherein the step of offering the first party to connect to the candidate party comprises offering the first party to connect to the candidate party after the first session with the second party has ended.

A fifth aspect of the present invention includes the features of the first aspect, wherein the step of determining if the message is a message associated with the first session comprising a contacting identity comprises comparing the time the message was sent with the times of communication sessions in a record of communication sessions and determining that it is such a message if the time the message was sent corresponds to the time of a communication session in the record of communication sessions.

A sixth aspect of the present invention includes the features of the first aspect, wherein the step of determining if the message is a message associated with the first session comprising a contacting identity comprises detecting a session contact information indicator of the message.

A seventh aspect of the present invention includes the features of the sixth aspect, wherein the session contact information indicator is a flag or a content description in the message.

An eighth aspect of the present invention includes the features of the sixth aspect, wherein the session contact information indicator is provided through the message being of a certain session contact information indicating type.

Another object of the present invention is to provide a portable communication device that simplifies the setting up of a connection to a candidate party from a first portable communication device associated with a first party in relation to a session between the first and a second party.

According to a ninth aspect of the present invention, this object is achieved by a portable communication device associated with a first party for simplifying the setting up of a connection to a candidate party in relation to a session between the first and a second party and comprising:
- a communication unit arranged to
  - engage in a first communication session between the first and the second party, and
  - receive an electronic message from the second party, and
- a control unit arranged to
  - determine if the message is a message associated with the first session comprising a contacting identity for reaching the candidate party,
  - if the message is a message associated with the first session comprising a contacting identity
    - extract the contacting identity from the message,
    - offer the first party to connect to the candidate party, and
    - in case the first party accepts the offer, order the communication unit to initiate a connection to the candidate party using the contacting identity.

A tenth aspect of the present invention includes the features of the ninth aspect, further comprising a contacts store, wherein the control unit is further arranged to store the contacting identity in the contacts store.

An eleventh aspect of the present invention includes the features of the ninth aspect, wherein the control unit when offering to connect to the candidate party is arranged to offer the first party to invite the candidate party to the first session and if the offer is accepted to order the communication unit to invite the candidate party to the first communication session between the first and the second party.

A twelfth aspect of the present invention includes the features of the ninth aspect, wherein the control unit when offering to connect to the candidate party is arranged to offer the first party to connect to the candidate party after the first session with the second party has ended.

A thirteenth aspect of the present invention includes the features of the ninth aspect, wherein the control unit when determining if the message is a message associated with the first session comprising a contacting identity is arranged to compare the time the message was sent with the times of communication sessions in a record of communication sessions and to determine that it is such a message if the time the message was sent corresponds to the time of a communication session in the record of communication sessions.

A fourteenth aspect of the present invention includes the features of the ninth aspect, wherein the control unit when determining if the message is a message associated with the first session comprising a contacting identity comprises detecting a session contact information indicator of the message.

A fifteenth aspect of the present invention includes the features of the fourteenth aspect, wherein the session contact information indicator is a flag or a content description in the message.

A sixteenth aspect of the present invention includes the features of the fourteenth aspect, wherein the session contact information indicator is provided through the message being of a certain session contact information providing type.

A seventeenth aspect of the present invention includes the features of the ninth aspect, wherein it is a cellular phone.

Another object of the present invention is to provide a computer program product that simplifies the setting up of a connection to a candidate party from a first portable communication device associated with a first party in relation to a session between the first and a second party.

According to an eighteenth aspect of the present invention this object is achieved by a computer program product for simplifying the setting up of a connection to a candidate party from a first portable communication device associated with a first party in relation to a session between the first and a second party and comprising:
- computer program code, to make the portable communication device execute, when the program code is loaded in the portable communication device, when the portable communication device is or has been engaged in a first communication session between the first and the second party and receives an electronic message from the second party,
  - determine if the message is a message associated with the first session comprising a contacting identity for reaching the candidate party,
  - if the message is a message associated with the first session comprising a contacting identity
    - extract the contacting identity from the message,
    - offer the first party to connect to the candidate party, and
    - in case the first party accepts the offer, order an initiation of a connection to the candidate party to be made using the contacting identity.

According to a nineteenth aspect of the present invention, there is provided a portable communication device associated with a first party for simplifying the setting up of a connection to a candidate party in relation to a session between the first and a second party and comprising:
- means for engaging in a first communication session between the first and the second party,
- means for receiving an electronic message from the second party,
- means for determining if the message is a message associated with the first session comprising a contacting identity for reaching the candidate party,
- means for, if the message is a message associated with the first session comprising a contacting identity, extracting the contacting identity from the message and offering the first party to connect to the candidate party, and
- means for, in case the first party accepts the offer, initiating a connection to the candidate party using the contacting identity.

Another object of the present invention is to provide a method that enables simplifying the setting up of a connection to a candidate party from a first portable communication device associated with a first party in relation to a session between the first and a second party.

According to a twentieth aspect of the present invention this object is achieved by a method of delivering a contacting identity regarding a candidate party to a first party from a communication device associated with a second party during a session between the first and the second party and comprising the steps of:
- engaging in a first communication session between the first and the second party,
- generating an electronic message associated with the first session comprising a contacting identity for reaching the candidate party, and
- sending the message to the first party during the session.

A twenty-first aspect of the present invention includes the features of the twentieth aspect, wherein the message is generated based on inputs made by the second party.

A twenty-second aspect of the present invention includes the features of the twentieth aspect, wherein the message is generated automatically based on the initiation of the session.

A twenty-third aspect of the present invention includes the features of the twentieth aspect, further comprising the step of providing the message with a session contact information indicator.

A twenty-fourth aspect of the present invention includes the features of the twenty-third aspect, wherein the session contact information indicator is provided as a flag or as a content description inside the message.

A twenty-fifth aspect of the present invention includes the features of the twenty-third aspect, wherein the session contact information indicator is provided through making the message into a session contact information providing type of message.

Another object of the of the present invention is to provide a communication device that enables simplifying the setting up of a connection to a candidate party from a first portable communication device associated with a first party in relation to a session between the first and a second party.

According to a twenty-sixth aspect of the present invention, this object is achieved by a communication device associated with a second party for delivering a contacting identity regarding a candidate party to a first party during a session between the first and the second party and comprising:
- a communication unit arranged to engage in a first communication session between the first and the second party,
- a message providing unit arranged to
  - generate an electronic message associated with the first session comprising a contacting identity for reaching the candidate party, and
  - order the communication unit to send the message to the first party during the session.

A twenty-seventh aspect of the present invention includes the features of the twenty-sixth aspect, wherein the communication device is a portable communication device, where the message providing unit is arranged to generate the message based on inputs made by a user of the portable communication device.

A twenty-eighth aspect of the present invention includes the features of the twenty-seventh aspect, wherein it is a cellular phone.

A twenty-ninth aspect of the present invention includes the features of the twenty-sixth aspect, wherein it is a voice mail server and the message providing unit is arranged to generate the message automatically based on the initiation of the session.

A thirtieth aspect of the present invention includes the features of the twenty-sixth aspect, wherein the message providing unit is arranged to provide the message with a session contact information indicator.

A thirty-first aspect of the present invention includes the features of the thirtieth aspect wherein the session contact information indicator is provided as a flag or as a content description inside the message.

A thirty-second aspect of the present invention includes the features of the thirtieth aspect, wherein the session contact information indicator is provided through making the message into a session contact information providing type of message.

Another object of the present invention is to provide a computer program product that enables simplifying the setting up of a connection to a candidate party from a first portable communication device associated with a first party in relation to a session between the first and a second party.

According to a thirty-third aspect of the present invention, this object is achieved by a computer program product for delivering a contacting identity regarding a candidate party to a first party during a session between the first and a second party and comprising computer program code, to make a communication device associated with the second party execute, when the program code is loaded in the communication device and the communication device is engaged in a first communication session between the first and the second party:
- generate an electronic message associated with the first session comprising a contacting identity for reaching the candidate party, and
- order the sending of the message to the first party during the session.

According to a thirty-fourth aspect of the present invention, there is provided a communication device associated with a second party for delivering a contacting identity regarding a candidate party to a first party during a session between the first and the second party and comprising:
- means for engaging in a first communication session between the first and the second party,
- means for generating an electronic message associated with the first session comprising a contacting identity for reaching the candidate party, and
- means for sending the message to the first portable communication device during the session.

Another object of the present invention is to provide a communication network that provides a fair billing of used services.

According to a thirty-fifth aspect of the present invention this object is achieved by a communication network providing communication sessions between a first party and a second party, and arranged to:
- detect and route an electronic message associated with a first session between the first and second party comprising a contacting identity for reaching a candidate party, the message being sent from the second party to the first party during the first communication session, and
- billing the first party for the message being sent through the network.

The invention has the following advantages. It is easy to implement. It can be implemented by just some slight modifications of the software in the phone. This also makes the cost of the invention low. It furthermore greatly simplifies the life of the first party and removes the need of manual inputting of a contacting identity. It is thus very user friendly.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which:

FIG. 8 shows a flow chart of method steps performed in a phone of a first party according to the second embodiment of the present invention.

DETAILED DESCRIPTION OF EMBODIMENTS

Figure 1:
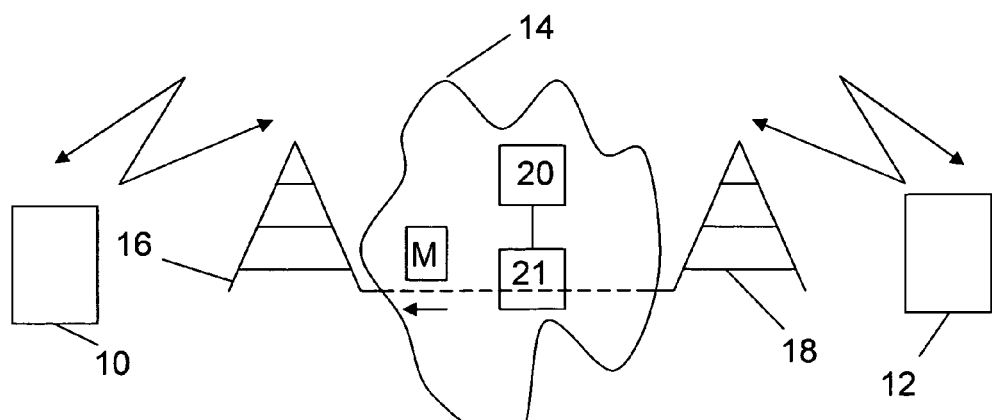
FIG. 1 schematically shows a first portable communication device in the form of a cellular phone communicating with a second communication device, also in the form of a cellular phone, via a cellular network.

FIG. 1 schematically shows a first portable communication device 10 communicating with a second portable communication device 12 via a cellular network 14. Because of this the first portable communication device 10 is communicating with the network 14 via a first base station 16 and the second portable communication device 12 is communicating with the network 14 via a second base station 18. The network is normally a WCDMA network. It is also possible that the network is a GPRS or a GSM network or any third generation cellular network. The network 14 here includes a routing unit 21 arranged to route calls and messages between the phones as well as to detect messages according to the invention. The network 14 also includes a billing unit 20 arranged to provide bills to different users of the network according to the communication sessions they initiate and messages they send. It should here be realised that the second device 12 need not be a portable communication device, but may be any type of communication device capable of communicating with the network and send messages as well as engage in communication sessions involving voice. According to one embodiment of the present invention it is a voice mail server.

Figure 2:
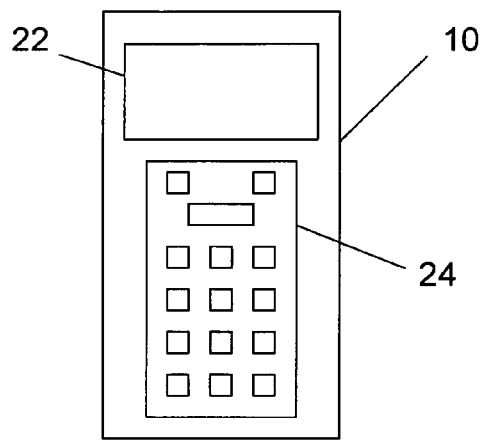
FIG. 2 shows a front view of the phone in FIG. 1.

FIG. 2 shows a front view of the first portable communication device 10. It should however be realised that the second portable communication device can look the same, why this view is applicable also for this device. In the preferred embodiment the device is a cellular phone 10 having a display 22 and a keypad 24 including a number of keys. The keypad 24 is used for entering information such as making and accepting the reception of phone calls, selection of functions and responding to prompts and the display 22 is used for displaying functions and prompts to a user of the phone. The phone also includes an antenna, which is used for communication with other devices, like the second portable communication device. However the antenna is in-built in the phone and hence not shown in the figure. The phone also includes a speaker for presenting sounds to a user, which speaker is also not shown. A cellular phone is just one example of a device in which the invention can be implemented. The invention can for instance also be used in a PDA (personal digital assistant), a palm top computer, a lap top computer, a cordless phone or a smartphone, provided they have phone call handling functionalities.

Figure 3:
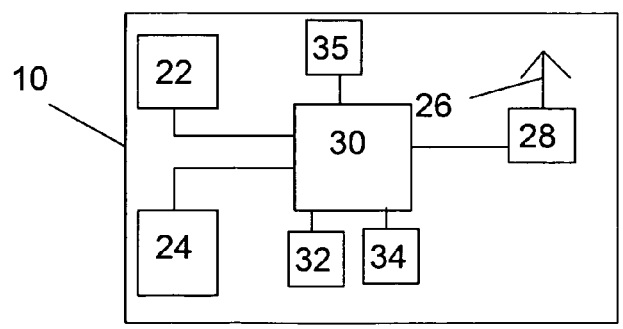
FIG. 3 shows a block schematic of the relevant parts of the phone in FIG. 2 according to one variation of the present invention.

FIG. 3 shows part of the interior of the cellular phone that is relevant for the present invention and that is to be used in both the first and second portable communication devices according to a first embodiment of the present invention. The phone 10 includes an antenna 26 connected to a communication unit in the form of a radio circuit 28 for enabling radio communication with the network of FIG. 1. The radio circuit 28 is connected to a control unit 30. The control unit 30 is connected to the display 22 and to the keypad 24 for receiving inputs and selections from the user of the phone. The control unit 30 is also connected to a contacts store 32, which is normally provided in a PIM manager handling a phone book, a calendar and other such functions related to the phone 10. The control unit 30 is also connected to a session log store 34, where the sessions the first portable communication device has been engaged in are stored as well as a message generating unit 35 arranged to generate messages that can be transferred to other devices.

Figure 4:
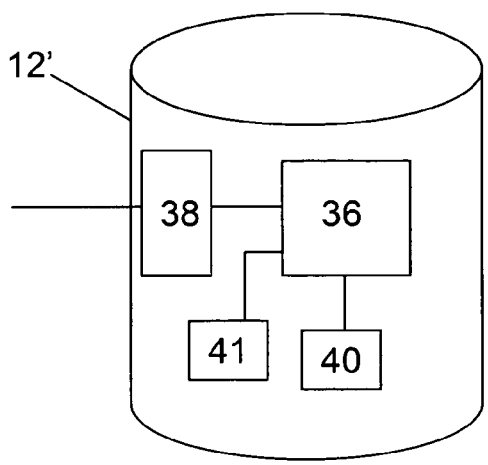
FIG. 4 shows a block schematic of a voice mail server according to another variation of the present invention.

FIG. 4 schematically shows a variation of the second communication device, 12', which is provided as a voice mail server. The voice mail server 12' is here provided with a communication unit 38 for connection to the network 14 and being connected to a control unit 36, which control unit is connected to a voice message store 40 and to a message generating unit 41.

Figure 5:
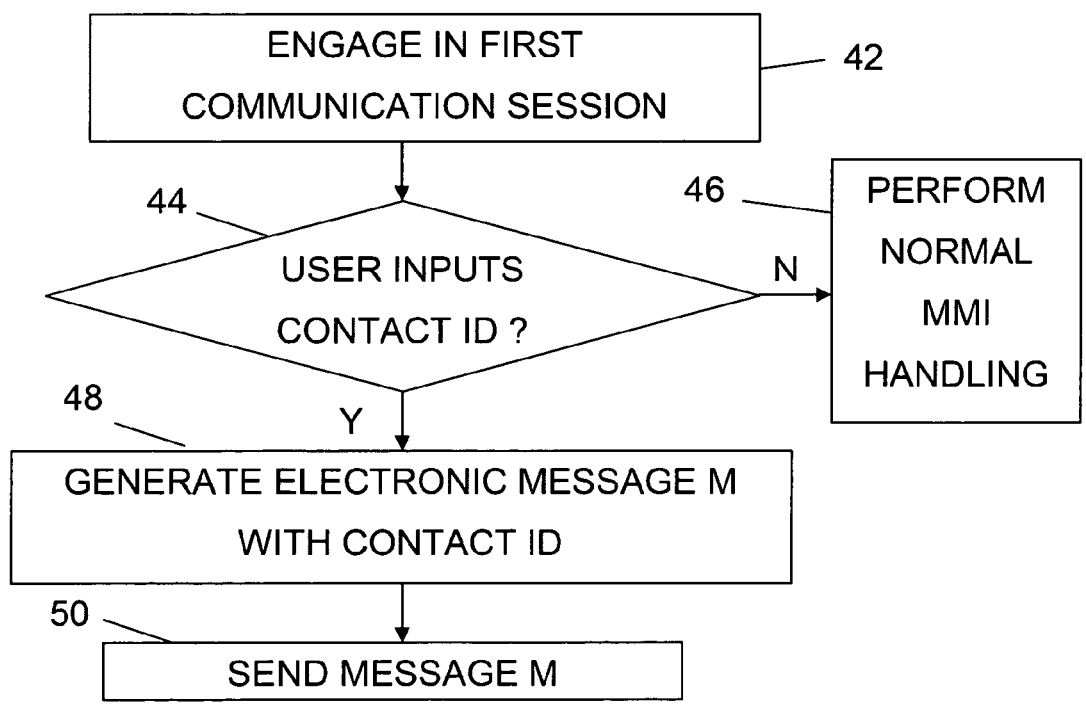
FIG. 5 shows a flow chart of method steps performed in the phone of a second party according to a first embodiment of the invention.
Figure 6:
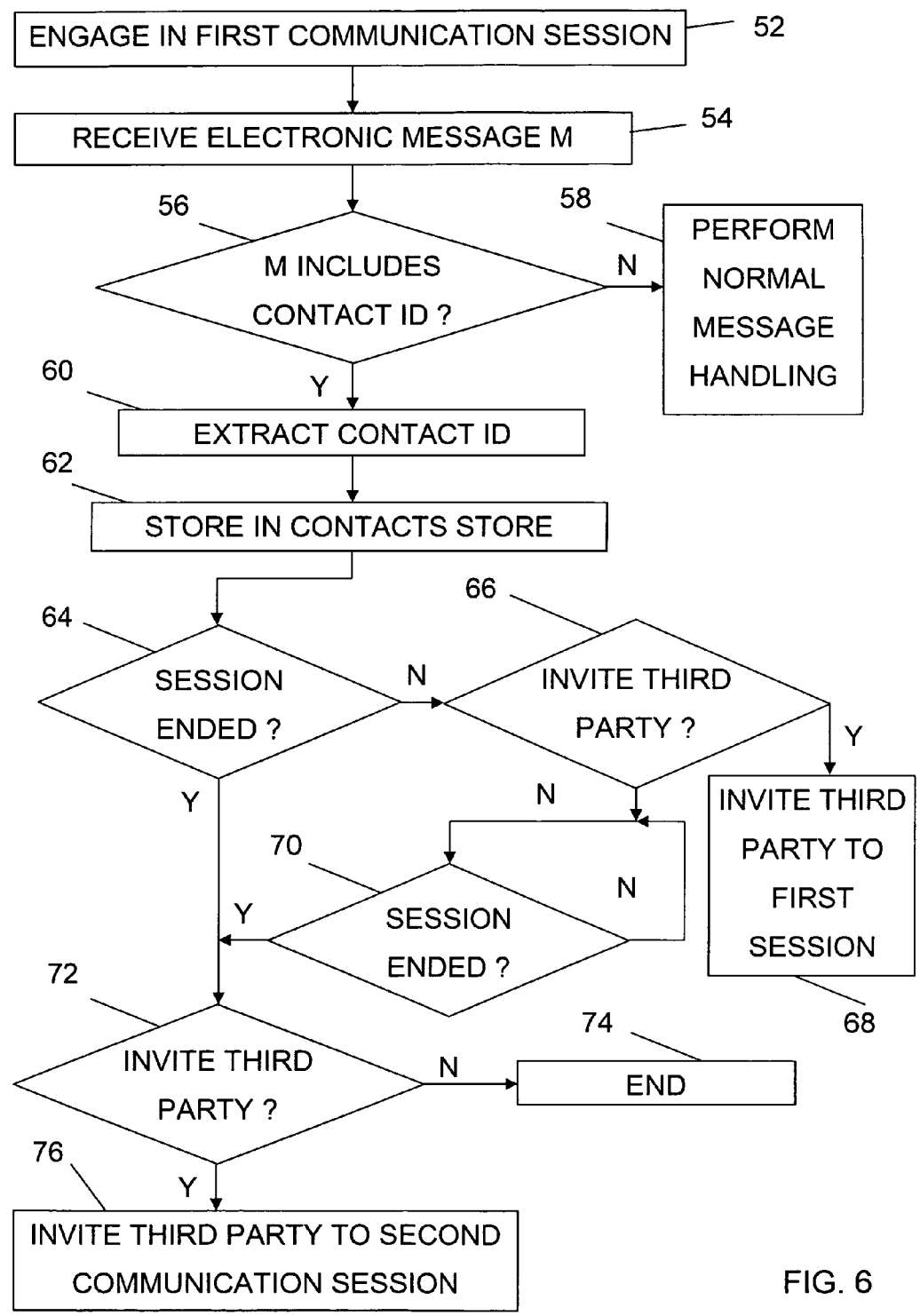
FIG. 6 shows a flow chart of method steps performed in a phone of a first party according to the first embodiment of the present invention.

The functioning of the invention according to an embodiment of the present invention will now be described in relation to the previously described FIG. 1-3 together with FIGS. 5 and 6, which shows flow charts of method steps performed in the first portable communication device and the second portable communication device, respectively, according to a first embodiment of the present invention.

The phone 10 according to the invention can make and receive calls using the control unit 30 in combination with the radio circuit 28 and antenna 26. A user of the phone 10, hereafter named first party, can initiate a communication session with a user of the second portable communication device 12, which user is herein called a second party. A session can be a voice session, but may also include other types of data such as video. The session may also support exchange of messages, and may thus be an IMS/SIP session. It is not relevant which party starts the session, thus also the second party may start the session. The method starts by the two parties engaging in a first communication session, steps 42 and 52, which is done under the control of the control units 30 using the communication units 26 and antennas 28. During this first session the two parties can talk to each other. During the first session the first party may then ask for a phone number or some other contacting identity relating to a third party, herein generally denoted candidate party, which the first party wants to contact. It should here be realised that the contacting identity can be provided by the second party on the initiative of the second party and that the contacting identity may also be associated with the second party, hence the use of the expression candidate party. The control unit 30 of the second portable communication device 12 therefore monitors user inputs made by the second party using the keypad 24 during the first session. If the second party then inputs a contact identifier, step 44, the control unit 30 orders the message generating unit 35 to generate a message M as a special contacts information message that is associated with the first session, and if not, step 44, the message handling unit 35 is allowed to perform normal message handling, step 46. The determination of if the message is a special message can be the detection of the second party selecting contact information, for instance in the form of a Vcard, comprising a contacting identifier from the contacts store during the session. It can also be the detection of a manual input of a contacting identifier, such as for instance a phone number, an e-mail address or some similar contacting identifier. Then the control unit 30 makes the message handling unit 35 to set the message as a special contacts information message associated with the first session. This may be done through providing the message with a session contact information indicator, such as a special flag or some other information in the message like a content description informing recipients of the fact that the message is a special contacts information message associated with a session. It is possible that the second phone 12 also selects a special dedicated type of message, i.e. a message type that has been pre-defined as a session contact information providing type of message, which is a message associated with an ongoing session that includes or to which is attached a contacting identifier. The contacting identifier may be included inside the message or be provided as an attachment to the message and may be a contact record for a candidate party, for instance a VCard attachment. Once this message M has been created it is then being sent via the communication unit 28 and antenna 26, step 50, and it is being sent during the first session, i.e. when the first session is active. Thereafter the message is sent to the first portable communication device, step 50.

As an alternative the second phone 12 may not be provided with the ability to create a special contacts information message associated with the first session, in which case the message is created as a normal message without any flag or indication.

The message M is then received by the antenna 26 of the first portable communication device 10, step 54, and forwarded to the control unit 30 via the communication unit 28. There the control unit 30 investigates if the message is a special contacts information message associated with the session including a contacting identity, step 56, which may be done through investigating the presence of a contact information indicator such as a flag. If it is not step 56, the message M is forwarded to the message handling unit 35 for normal message handling, step 58. If however it is, the control unit 30 automatically extracts the contacting identity, step 60, and stores it in the contacts store 32. Thus now the first party may easily obtain the contacting identity for initiating communication sessions with the candidate party through selecting the party in the contacts store. The control unit 30 then goes on and investigates if the session is ended or not, step 64. If it is not the control unit 30 then offers the first party to invite the third party to the active first session, step 66. If the first party accepts, the third party is invited to the first session, step 68, which may be done through the control unit 30 ordering the communication unit 28 to make the session into a conference call also including the third party using the contacting identity received. If the first party declines, step 66, the control unit 30 goes on and yet again investigates if the session is ended, step 70, and if it is not it waits until it has ended. If the session has ended, either because the message M was received after the end of the first session, step 64, or if the first party declined to invite the third party, steps 66 and 70, the control unit 30 once again offers the first party to invite the third party to a session, step 72. If the first party now declines, the method is ended, step 74, while if he accepts, the control unit 30 orders the communication unit 28 to invite the third party to a second communication session for instance through initiating a connection or initiating the setting up of a call to the third party, step 76.

According to this method it is possible for the first party to receive and be able to use contacting information received from the second party in a very user friendly and efficient manner. There is no need for extensive manual input of contacting identifiers.

It should here be realised that the first party is not necessarily offered to include the third party in the first session, but that the control unit of the first portable communication device always waits until the first session is ended. It is also possible that the first party is never offered to contact the third party, but that the contacting identity is only stored in the contacts store. It is furthermore possible that the first party is only offered to invite the candidate party to the first session and not to make the offer after the end of the first session. The offer may also only be provided once.

When determining that the message is a special contacts information message associated with the first session it is possible for the control unit to investigate the flag or special indication in the message. However it is also possible that the first portable communication device may determine that it is a special contacts information message associated with the first session without there being a special indication. This may be done through the control unit checking a time stamp of the message indicating the time the message was sent from the second portable communication device. This time stamp is then compared with the times of a record of sessions stored in the session log store 34. If this time stamp then lies within the time span of a previous session or is after the starting time of an ongoing non-ended session, the message is considered to be a special contacts information message associated with that session. This could be further combined with comparing if the identity of the sender of the message is the same as the identity of a corresponding part of a first session for which a match is made.

This has the advantage of allowing the first portable communication device to be able to determine that the message is a special contacts information message associated with the first session even if the second device does not have the capability to indicate that the message is such a message.

Figure 7:
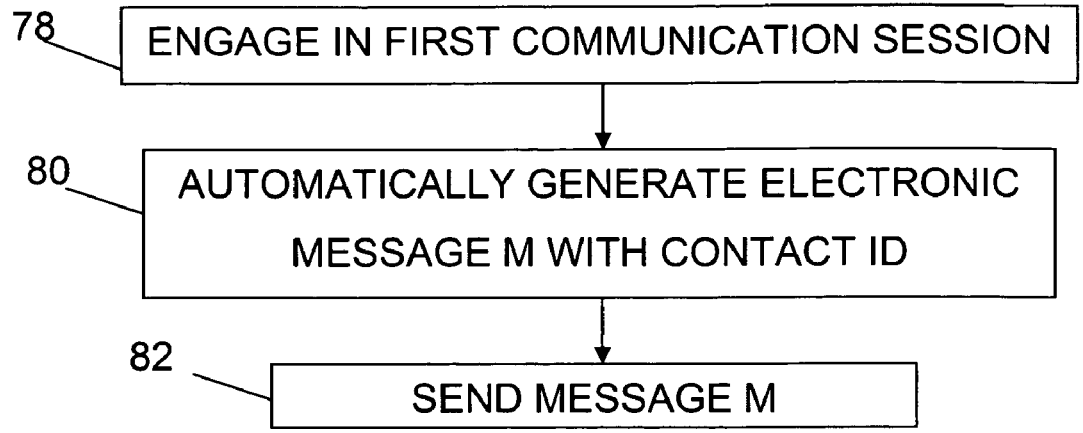
FIG. 7 shows a flow chart of method steps performed in a voice mail server of a second party according to a second embodiment of the invention.

As mentioned above the second device need not be a portable communication device but can for instance be a voice mail server. Now a second embodiment of the present invention describing such a scenario will be described with reference being made to FIG. 1-4 as well as to FIGS. 7 and 8, where the latter two figures show the method steps provided in the voice mail server and the first phone, respectively. The method starts by the two parties engaging in a first communication session, steps 78 and 84. Since it is a voice mail server 12', the session is engaged through the first portable communication device 10 calling the server or getting connected to it after having called a number of a subscriber associated with this voice mail server 12'. The server 12' then plays a voice message fetched from voice message store 40 and associated with the subscriber. Such a subscriber is here called a user of the voice mail server 12'. The user of the voice mail server 12' may here have recorded a voice message stored in voice message store 40, where he mentions a contacting identity such as a phone number on where he is to be reached. He has also been allowed to enter the contacting identity of a candidate party into the voice mail server, for instance through sending a Vcard or some other contact information record to the server or in some other way entering the information in the server, for instance through a web site. The contacting identity is here provided to the message generating unit 41. As the first party calls the server 12', he may then be presented with the option of receiving a contacting identity of a candidate party via a message. The offer may be accepted through the use of tone dialing. In any way, during this session the control unit 36 of the voice mail server fetches a voice message associated with the user from the voice message store 40 and forwards it to the phone 10 of the first party. At the same time it automatically orders the message generating unit 41 to generate a special contacts information message M associated with the session including the contacting identity of the candidate party specified by the user of the voice mail server, step 80, and sends that message M to the first party via the communication unit 38 while the first session is ongoing, step 82. Thus an electronic message M is automatically generated and sent. As the phone 10 of the first party receives the message M, step 86, the control unit 30 of the phone 10 investigates if the message M is a message associated with the session including a contacting identity, step 88, in the same manner as described in relation to the first embodiment. If it does not, normal message handling is performed, step 90. If however it does, the contacting identity is automatically extracted, step 92, and stored in the contacts store, step 98. Now the phone 10 waits until the session is ended. After the session is ended it then offers the first party to invite the candidate party to the session, step 96, and if the first party selects to, the candidate party is then invited to a second session for instance through initiating a connection or initiating the setting up of a phone call to the candidate party, step 98. If not the method is ended, step 100.

It should be realised that the candidate party is in this case normally the same person for which the voice mail message was created, i.e. the user of the voice mail server 12'.

The checking of if the message is a special message associated with the session can here be performed in the same way as in the first embodiment. The main difference between the first and second embodiment with respect to the first phone 10, is that is that in this second embodiment, there is no invitation made to the first session.

Normally it is the sender of messages that gets billed. Since it is normally the first party that asks for a contacting identity, it can be argued if this is acceptable. The routing unit of the network may therefore keep track of messages it routes and if it sees that a special contacts information message associated with a session according to the invention passes through the network it informs the billing unit of this fact, which billing unit then goes on and bills the first party for the message although it is in fact the second party that sends it.

The control units and message handling units, routing unit and billing unit according to the present invention are preferably provided in the form of one or more processors with corresponding memory containing the program code for performing their functions and the voice mail store, contacts store and session log stores are provided in the form of memories, such as ROM, RAM, hard discs etc.

Figure 9:
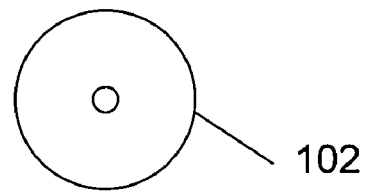
FIG. 9 shows a CD ROM disc on which program code for executing a method according to the invention is provided.

The program code mentioned above can also be provided on a data carrier such as a CD ROM disc 102 as depicted in FIG. 9 or an insertable memory stick or a USB memory device, which will perform the invention when loaded into a phone having suitable processing capabilities or when loaded into a server. The program code can also be downloaded remotely from another server either outside or inside the network or in the case of a phone be downloaded via a computer like a PC to which the phone is temporarily connected.

The present invention has several advantages apart from those already described. It is easy to implement. It can be implemented by just some slight modifications of the software in the phone. This also makes the cost of the invention low. It furthermore greatly simplifies the life of the first party and removes the need of manual inputting of a contacting identity. It is thus very user friendly.

There are a number of further variations that are possible regarding the present invention. First it should be mentioned that the invention is not limited to one contacting identity relating to a candidate party. Indeed there may be several such identities provided for a candidate party such as one or more phone numbers and one or more e-mail addresses. The first communication session is furthermore not limited to a session between two parties, there may be several parties involved and the first party may receive special contacts information messages from all these parties. It is furthermore possible for the first portable communication device to start sessions with all such candidate parties for instance through setting up a conference call. The session initiated with a candidate party is furthermore not limited to calls, either voice or video. It can also involve only sending a message to the candidate party.

The phone of FIG. 3 does not need to have all the units specified there, but only those that are needed for performing the function of interest. Thus the first portable communication device need not be provided with a message generating unit and if special contacts information messages are provided with a contact information indicator then no session log store is needed either. The control unit of the second portable communication device need not be provided with a special message identifying function and there might also be no contacts store. Thus the present invention is only to be limited by the following claims.

The invention claimed is:

1. A method of simplifying a connection to a candidate party from a first portable communication device associated with a first party in relation to a session between the first party and a second portable communication device associated with a second party, the method comprising:
    engaging in a first communication session between the first party and the second party by the first portable communication device and the second portable communication device;
    receiving, by the first portable communication device, an electronic message from the second party;
    determining, by the first portable communication device, if the electronic message is a message associated with the first communication session, including contacting identity data for reaching the candidate party, by comparing a time that the electronic message was sent with times of communication sessions in a record of communication sessions and determining if the time that the electronic message was sent corresponds to a time of a communication session in the record of communication sessions; and
    if the electronic message is a message associated with the first communication session including contacting identity data,
        extracting the contacting identity data from the electronic message,
        offering the first party to connect to the candidate party, and
        if the first party accepts the offer, initiating a connection to the candidate party using the contacting identity data.

2. The method according to claim 1, further comprising:
    storing the contacting identity data in a contacts store of the first portable communication device.

3. The method according to claim 1, where the offering the first party to connect to the candidate party comprises offering the first party to invite the candidate party to the first communication session; and
    the initiating a connection to the candidate party comprises inviting the candidate party to the first communication session between the first party and the second party.

4. The method according to claim 1, where the offering the first party to connect to the candidate party comprises offering the first party to connect to the candidate party after the first communication session with the second party has ended.

5. The method according to claim 1, where the determining, by the first portable communication device, if the electronic message is a message associated with the first communication session, including contacting identity data, further comprises detecting a session contact information indicator of the electronic message.

6. The method according to claim 5, where the session contact information indicator is a flag or a content description in the message.

7. The method according to claim 5, where the session contact information indicator is provided by the electronic message being a certain type of message.

8. A portable communication device associated with a first party for simplifying a connection to a candidate party in relation to a session between the first party and a second portable communication device associated with a second party, the portable communication device comprising:
a communication unit to:
engage in a first communication session between the first party and the second party, and
receive an electronic message from the second party; and
a control unit to:
determine if the electronic message is a message associated with the first communication session including contacting identity data for reaching the candidate party, by comparing a time that the electronic message was sent with times of communication sessions in a record of communication sessions and determining if a time that the electronic message was sent corresponds to a time of a communication session in the record of communication sessions, and
if the electronic message is a message associated with the first communication session including contacting identity data, to:
extract the contacting identity data from the electronic message,
offer the first party to connect to the candidate party, and
if the first party accepts the offer, order the communication unit to initiate a connection to the candidate party using the contacting identity data.

9. The portable communication device according to claim 8, further comprising a contacts store, where the control unit is to store the contacting identity data in said contacts store.

10. The portable communication device according to claim 8, where the control unit is further to offer the first party to invite the candidate party to the first communication session and to cause the communication unit to invite the candidate party to the first communication session between the first party and the second party.

11. The portable communication device according to claim 8, where the control unit is further to offer the first party to connect to the candidate party after the first communication session with the second party has ended.

12. The portable communication device according to claim 8, where the control unit is further to detect a session contact information indicator associated with the electronic message.

13. The portable communication device according to claim 12, where the session contact information indicator is a flag or a content description in the electronic message.

14. The portable communication device according to claim 12, where the session contact information indicator is provided by the electronic message being a certain type of message.

15. The portable communication device according to claim 8, where the portable communication device is a cellular phone.

16. A computer program product, tangibly stored on a first portable communication device associated with a first party, for simplifying a connection to a candidate party from the first portable communication device in relation to a session between the first party and a second portable communication device associated with a second party, comprising:
computer program code that when executed by the first portable communication device causes the first portable communication device to:
determine, by the first portable communication device, if a message, received from the second party, is a message associated with a first communication session between the first party and the second party, including contacting identity data for reaching the candidate party, by comparing a time that the electronic message was sent with times of communication sessions in a record of communication sessions and determining if the time that the electronic message was sent corresponds to a time of a communication session in the record of communication sessions, and
if the electronic message is a message associated with the first communication session including contacting identity data,
extract the contacting identity from the electronic message,
offer the first party to connect to the candidate party, and
if the first party accepts the offer, order an initiation of a connection to the candidate party to be made using the contacting identity data.

17. A portable communication device associated with a first party for simplifying a connection to a candidate party in relation to a session between the first party and a second party, comprising:
means for engaging in a first communication session between the first party and the second party,
means for receiving an electronic message from the second party,
means for determining if the electronic message is a message associated with the first communication session, including contacting identity data for reaching the candidate party, by comparing a time that the message was sent with times of communication sessions in a record of communication sessions and determining if the time that the message was sent corresponds to a time of a communication session in the record of communication sessions,
means for extracting the contacting identity data from the message and offering the first party to connect to the candidate party; and
means for initiating a connection to the candidate party using the contacting identity data.

18. A method of delivering contacting identity data for reaching a candidate party, to a first party from a communication device associated with a second party during a session between the first party and the second party, the method comprising:
engaging in a first communication session between the first party and the second party;
generating an electronic message, including the contacting identity data for reaching the candidate party, associated with the first communication session; and
sending the electronic message to a first communication device associated with the first party during the session, the electronic message causing the first communication device to determine if the electronic message is the electronic message associated with the first communication session, including the contacting identity data for reaching the candidate party, by comparing a time that the electronic message was sent with times of communication sessions in a record of communication sessions and determining if the time that the electronic message was sent corresponds to a time of a communication session in the record of communication sessions and causing the first communication device to automatically extract the contacting identity and offer the first party to invite the candidate party to join in the first communication session, using the contacting identity data.

19. The method according to claim 18, where the electronic message is generated based on inputs made by the second party.

20. The method according to claim 18, where the electronic message is generated automatically based on the initiation of the session.

21. The method according to claim 18, further comprising providing the electronic message with a session contact information indicator.

22. The method according to claim 21, where the session contact information indicator is provided as a flag or as a content description inside the electronic message.

23. The method according to claim 21, where the session contact information indicator is provided by the message being a certain type of message.

24. A communication device associated with a second party for delivering a contacting identity regarding a candidate party to a first party during a session between the first and the second party, comprising:
   a communication unit to engage in a first communication session between the first party and the second party; and
   a message providing unit to:
      generate an electronic message, including a contacting identity data for reaching the candidate party associated with the first communication session, and
      cause the communication unit to send the electronic message to a first communication device associated with the first party during the first communication session, the electronic message causing the first communication device to determine if the electronic message is the electronic message associated with the first communication session, including the contacting identity data for reaching the candidate party, by comparing a time that the electronic message was sent with times of communication sessions in a record of communication sessions and determining if the time that the electronic message was sent corresponds to a time of a communication session in the record of communication sessions and to automatically extract the contacting identity data and offer the first party to invite the candidate party to join in the first communication session, using the contacting identity data.

25. The communication device according to claim 24, where the communication device is a portable communication device, and where the electronic message providing unit is to generate the electronic message based on inputs made by a user of the portable communication device.

26. The communication device according to claim 25, where the portable communication device is a cellular phone.

27. The communication device according to claim 24, where the portable communication device is a voice mail server and the message providing unit is to generate the electronic message automatically based on the initiation of the first communication session.

28. The communication device according to claim 24, where the message providing unit is to provide the electronic message with a session contact information indicator.

29. The communication device according to claim 28, where the session contact information indicator is provided as a flag or as a content description inside said message.

30. The communication device according to claim 28, where the session contact information indicator, provided by the electronic message, is a certain type of message.

31. A computer program product, tangibly stored on a second communication device, associated with a second party, for delivering contacting identity data for reaching a candidate party, to a first party during a session between the first party and the second party and comprising computer program code, that when executed by the second communication device, causes the second communication device to:
   generate an electronic message, including the contacting identity data for reaching the candidate party, associated with a first communication session between the first party and the second party; and
   send the electronic message to the first party, by the second communication device, during the first communication session, the electronic message causing the first communication device to determine if the electronic message is the electronic message associated with the first communication session, including the contacting identity data for reaching the candidate party, by comparing a time that the electronic message was sent with times of communication sessions in a record of communication sessions and determining if the time that the electronic message was sent corresponds to a time of a communication session in the record of communication sessions and to automatically extract the contacting identity data and offer the first party to invite the candidate party to join in the first communication session, using the contacting identity data.

32. A communication device associated with a second party for delivering contacting identity data regarding a candidate party to a first party during a session between the first party and the second party, comprising:
   means for engaging in a first communication session between the first party and the second party,
   means for generating an electronic message, including contacting identity data for reaching the candidate party, associated with the first communication session; and
   means for sending the message to the first portable communication device during the first communication session, the electronic message causing the first communication device to determine if the electronic message is the electronic message associated with the first communication session, including the contacting identity data for reaching the candidate party, by comparing a time that the electronic message was sent with times of communication sessions in a record of communication sessions and determining if the time that the electronic message was sent corresponds to a time of a communication session in the record of communication sessions and to automatically extract the contacting identity data and offer the first party to invite the candidate party to join in the first communication session, using the contacting identity data.

33. A communication network providing communication sessions between a first party and a second party, the communication network to:
   detect and route an electronic message, including contacting identity data for reaching a candidate party, associated with a first communication session between the first party and the second party, the electronic message being sent from the second party to the first party during the first communication session, the electronic message causing the first communication device to determine if the electronic message is the electronic message associated with the first communication session, including the contacting identity data for reaching the candidate party, by comparing a time that the electronic message was sent with times of communication sessions in a record of communication sessions and determining if the time that the electronic message was sent corresponds to a time of a communication session in the record of communication sessions and to automatically extract the contacting identity data and offer the first party to invite the candidate party to join in the first communication session, using the contacting identity data; and bill the first party for the message being sent through the communication network.

* * * * *